(12) United States Patent
Lin et al.

(10) Patent No.: US 7,738,206 B1
(45) Date of Patent: Jun. 15, 2010

(54) METHOD AND APPARATUS FOR PROVIDING AN EARLY WARNING OF THERMAL DECAY IN MAGNETIC STORAGE DEVICES

(75) Inventors: G. Herbert Lin, San Jose, CA (US); Davide Guarisco, Palo Alto, CA (US); Xiaokun Chew, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 1796 days.

(21) Appl. No.: 09/922,459

(22) Filed: Aug. 3, 2001

Related U.S. Application Data

(60) Provisional application No. 60/223,444, filed on Aug. 4, 2000.

(51) Int. Cl.
*G11B 5/02* (2006.01)
(52) U.S. Cl. .................. 360/59; 360/25; 360/31; 360/53
(58) Field of Classification Search .............. 360/25, 360/31, 66, 68, 53, 46, 67, 51, 75; 324/210, 324/212, 226
See application file for complete search history.

(56) References Cited

U.S. PATENT DOCUMENTS

| | | | | |
|---|---|---|---|---|
| 5,810,477 | A * | 9/1998 | Abraham et al. | 374/7 |
| 6,084,729 | A | 7/2000 | Ito | 360/31 |
| 6,088,176 | A * | 7/2000 | Smith et al. | 360/46 |
| 6,091,559 | A * | 7/2000 | Emo et al. | 360/48 |
| 6,147,827 | A * | 11/2000 | Southerland et al. | 360/53 |
| 6,347,016 | B1 * | 2/2002 | Ishida et al. | 360/17 |
| 6,373,647 | B1 * | 4/2002 | Baker | 360/25 |
| 6,429,984 | B1 * | 8/2002 | Alex | 360/31 |
| 6,445,525 | B1 * | 9/2002 | Young | 360/51 |
| 6,490,111 | B1 * | 12/2002 | Sacks | 360/53 |

(Continued)

OTHER PUBLICATIONS

"A Fast, Accurate, and Reproducible In-Drive Measurement of Media Thermal Decay", by B. Higgins and B. Scardt, IEEE Transactions on Magnetics, vol. 40, No. 1, Jan. 2004.*

(Continued)

*Primary Examiner*—Dismery E Mercedes
(74) *Attorney, Agent, or Firm*—Westman, Champlin & Kelly, P.A.

(57) ABSTRACT

A method and apparatus for providing an early warning of thermal decay in magnetic storage media are provided. In accordance with an embodiment of the present invention, a test pattern that is particularly susceptible to thermal decay is written to a disk. The test pattern is then read, and the amplitude of the signal produced by the test pattern is stored. When testing for thermal decay is desired, the test pattern is again read, and the amplitude of the signal produced in the channel is compared to the stored amplitude. If the later amplitude is less than the stored amplitude by at least a predetermined amount, a thermal decay warning signal is generated. In accordance with another embodiment of the present invention, a test pattern is written to a portion of a disk that has been identified as being particularly susceptible to thermal decay. The amplitude produced by the test pattern is then stored so that it can later be compared to an observed amplitude when testing for thermal decay. The present invention allows remedial measures to ensure the integrity of data to be taken before data loss due to thermal decay can occur.

100 Claims, 6 Drawing Sheets

U.S. PATENT DOCUMENTS

| | | | | |
|---|---|---|---|---|
| 6,525,891 B1* | 2/2003 | Tsunoda | ............. | 360/25 |
| 6,611,389 B1* | 8/2003 | Liu et al. | ............. | 360/31 |
| 6,633,442 B2* | 10/2003 | Quak et al. | ............. | 360/31 |
| 6,697,203 B1* | 2/2004 | Cheng et al. | ............. | 360/31 |
| 6,987,630 B1* | 1/2006 | Higgins et al. | ............. | 360/31 |
| 7,173,783 B1* | 2/2007 | McEwen et al. | ............. | 360/46 |
| 7,209,304 B2* | 4/2007 | Seng et al. | ............. | 360/25 |

OTHER PUBLICATIONS

"Thermal Decay in High Density Disk Media", by Y. Zhang and H. Bertrand, IEEE Transactions on Magnetics, vol. 34, No. 5, Sep. 1998.*

"Experimental Study of Thermal Decay in High-Density Magnetic Recording Media", by Y. Hosoe et al., IEEE Transactions on Magnetics, vol. 33, No. 5, Sep. 1997.*

"High Density Magnetic Recording Media Design and Identification: Susceptibility to Termal Decay", by P. Lu and S. Charap, IEEE Transactions on Magnetics, vol. 31, No. 6, Nov. 1995.*

Toigo, Jon William, "Avoiding a Data Crunch", *Scientific American*, pp. 59-74, May 2000, U.S.A.

McCarthy, et al., U.S. Appl. No. 09/767,894 Entitled "High Efficiency, Error Minimizing Coding Strategy Method and Apparatus" filed Jan. 22, 2001.

\* cited by examiner

METHOD AND APPARATUS FOR PROVIDING AN EARLY WARNING OF THERMAL DECAY IN MAGNETIC STORAGE DEVICES

Priority is claimed from U.S. Provisional Patent Application No. 60/223,444, filed Aug. 4, 2000 entitled "METHODS OF EARLY WARNINGS FOR THERMAL DECAY IN MAGNETIC DEVICES," which is incorporated herein by reference in its entirety.

FIELD OF THE INVENTION

The present invention relates to magnetic storage devices. More particularly, the present invention relates to the early detection of thermal decay in magnetic storage devices.

BACKGROUND OF THE INVENTION

Computer disk drives store digital information on magnetic disks. The magnetic disks are generally coated with a magnetic material capable of changing the direction of its magnetic orientation in response to an applied magnetic field. Information is stored on the magnetic disks as a series of magnetic transitions. Typically, the information is stored on each disk in concentric tracks that are divided into servo sectors and data sectors. Information is written to or read from a disk by a transducer head mounted on an actuator arm that is capable of moving the transducer head radially over the disk. The movement of the actuator arm allows the transducer head to access different tracks. The disks are rotated by a spindle motor at a high speed, allowing the transducer head to access different sectors within each track on the disk. The transducer head may include integrated read and write heads.

In response to the increasing need to store large amounts of digital data in connection with computer systems, magnetic storage devices have utilized increased data storage densities. In order to support high data densities, the magnetic material of the magnetic disks must be provided in a very thin layer. In addition, high data densities require magnetic material with a small grain size. A thin layer and a small grain size reduce noise, and allow magnetic transitions to be more closely spaced together. However, the energy required to switch the magnetization of the material is decreased when the magnetic material has a small grain size and is provided in a thin layer. Accordingly, as the grain size and the layer thickness of the magnetic material has decreased, the material has become more susceptible to data loss due to thermal decay.

Thermal decay is related to the ratio of the energy barrier that must be crossed in order to switch the magnetization of the magnetic material of a magnetic disk to the thermal energy of the surrounding environment. In general, as the energy in the environment becomes more nearly equal to this energy barrier, thermal decay is more likely to occur. A magnetic disk having only a thin layer of magnetic material is particularly susceptible to thermal decay because the energy required to switch the magnetization of a portion of that disk is low. In addition, when data is stored at high densities, the area of the disk used to store a bit of information as a particular magnetic polarity (i.e. a bit cell) is small. Therefore, the energy required to switch the magnetization of a bit cell is reduced with increased areal densities. Furthermore, as grain sizes have been reduced, the anisotropic energy associated with each grain has also been reduced. As the anisotropic energy of each grain becomes nearer to the ambient thermal energy in a disk drive, information stored on the magnetic disk is more likely to be lost due to thermal decay.

As will be understood by those skilled in the art, the anisotropic energy of a grain is the fixed amount of energy required to maintain a stored direction of magnetization in the magnetic material, and is equal to the anisotropic energy density, Ku, times the volume of the grain, V. A thermal instability ratio is defined as the anisotropic energy divided by the thermal energy, kT, and is given by the formula KuV/kT, which should be greater than 50 in a conventional disk drive for adequate thermal stability. Ultimately, if a certain number of grains change their direction of magnetization due to thermal effects, the amplitude of a signal produced in the transducer head when the affected area is read will be decreased. Once the stored information decays beyond a threshold level, it will be impossible to properly read data written to the disk with the read head. In particular, the loss in the amplitude of a signal produced in the transducer head will cause data to be lost.

In order to address the effects of thermal decay, various measures have been taken. For example, error correction code may be used to restore data lost through processes such as thermal decay. However, the ability of error correction code to restore lost data is limited. In addition, the use of error correction code results in decreased user data density.

Attempts have also been made to produce magnetic disks having grains with large anisotropic energies. However, increasing the anisotropic energy of the grains generally requires larger grain sizes. As mentioned above, a larger grain size increases the noise of a signal produced by data stored on the magnetic disk. In particular, the transition noise is increased. Increased noise reduces the signal to noise ratio, and may adversely affect the bit error rate of the disk drive. In addition, if the anisotropic energy is increased by increasing the anisotropic constant (Ku), the coercivity (Hc) is also increased, and it becomes more difficult to write transitions to the magnetic disk.

Disk drive manufacturers have also limited the effects of thermal decay by requiring the magnetic material on a magnetic disk to be at least a certain minimum thickness, thereby increasing the volume of grains within a bit cell. However, as with increased grain sizes, increasing the thickness of the magnetic material increases noise when data is read from the magnetic disk.

For the above-stated reasons, it would be desirable to provide a method and an apparatus that allowed for increased data storage densities, without losing data due to thermal decay. In particular, it would be desirable to provide a method and an apparatus capable of providing an early warning of thermal decay. In addition, it would be advantageous to provide such a method and apparatus that are reliable in operation and that are inexpensive to implement.

SUMMARY OF THE INVENTION

In accordance with the present invention, a method and an apparatus for providing an early warning of thermal decay in connection with magnetic storage media are provided. The present invention generally allows thermal decay to be detected before such decay has led to data loss from the magnetic storage device. In particular, the present invention allows remedial action to be taken before thermal decay results in data loss.

In accordance with one embodiment of the present invention, a test pattern determined to have a relatively high susceptibility to thermal decay is written to a magnetic storage device. For example, the test pattern may be written to a smaller volume of magnetic material than would be used if that test pattern were written as normal user data. This may be achieved by writing the test pattern using smaller bit cells, by writing the test pattern to an area of the disk having a thinner than average layer of magnetic material, or by using a combination of these approaches.

In accordance with a further embodiment of the present invention, the test pattern is written at a data frequency associated with a track or zone located at an outside diameter of a magnetic storage disk, but is written on a track located towards an inner diameter of the disk. Such an embodiment is particularly useful in connection with a longitudinal recording scheme.

In accordance with yet another embodiment, a gray code pattern of transitions is written to the outside diameter of the disk. Alternatively or in addition, the test pattern is written at a data frequency associated with a track or zone located at an inside diameter of a magnetic storage disk, but is written on a track located towards an outer diameter of the disk. Such an embodiment is particularly useful in connection with a perpendicular recording scheme.

In accordance with another embodiment of the present invention, the test pattern utilizes a pattern of transitions that have been determined to be particularly susceptible to thermal decay. Such a test pattern may be developed by design engineers in consideration of the magnetic and mechanical properties of the storage device. In addition, automated testing of a plurality of test patterns to select a pattern that is particularly susceptible to thermal decay in connection with a particular storage device or family of storage devices may be performed.

In accordance with still another embodiment of the present invention, a portion of the media upon which data is stored that is particularly susceptible to thermal decay is identified. For example, an area of the disk having an especially thin layer of magnetic material is identified. This area of the disk may be identified by reading the amplitudes of selected servo information, such as automatic gain control (AGC) fields. A sector associated with a piece of monitored servo sector information having a low amplitude is generally more susceptible to thermal decay, for example because it is associated with an area of the disk in which the layer of magnetic material is thinner. Accordingly, the volume of magnetic material in the area is relatively low, and the area is thus more susceptible to the effects of thermal decay. In accordance with yet another embodiment of the present invention, an area of a magnetic storage disk that is particularly susceptible to the effects of thermal decay is created on purpose. For example, an area of the disk corresponding to one or more sectors or tracks may be provided with a layer of magnetic material that is thinner than the layer of magnetic material in areas of the disk intended for storing normal user data. A test pattern may then be written to the area identified as being more susceptible to thermal decay or created to be more susceptible to thermal decay.

According to still another embodiment of the present invention, a pattern that has been determined to be particularly susceptible to thermal decay may be written to an area of the disk that is particularly susceptible to thermal decay.

Following the selection of a test pattern and/or a test pattern location, the test pattern is written to the storage device. The test pattern is then read, and the amplitude of the signal produced by reading the test pattern is stored. In order to detect an indication of thermal decay, the test pattern is later read again, and the amplitude of the signal thus obtained is observed. The observed amplitude is compared to the stored amplitude. If the stored amplitude is greater than the observed amplitude, a signal warning of thermal decay is generated. In accordance with still another embodiment of the present invention, a signal warning that thermal decay has been detected is generated if the stored amplitude is greater than the observed amplitude plus a marginal value.

In response to a signal warning of thermal decay, the storage device may automatically take measures to prevent data loss. For example, data stored in the device may be rewritten. Rewriting the data protects against data loss due to thermal decay by realigning magnetic domains that may have been altered due to the effects of thermal decay.

Additional advantages of the present invention will become readily apparent from the following discussion, particularly when taken together with the accompanying drawings.

DETAILED DESCRIPTION

Figure 1:
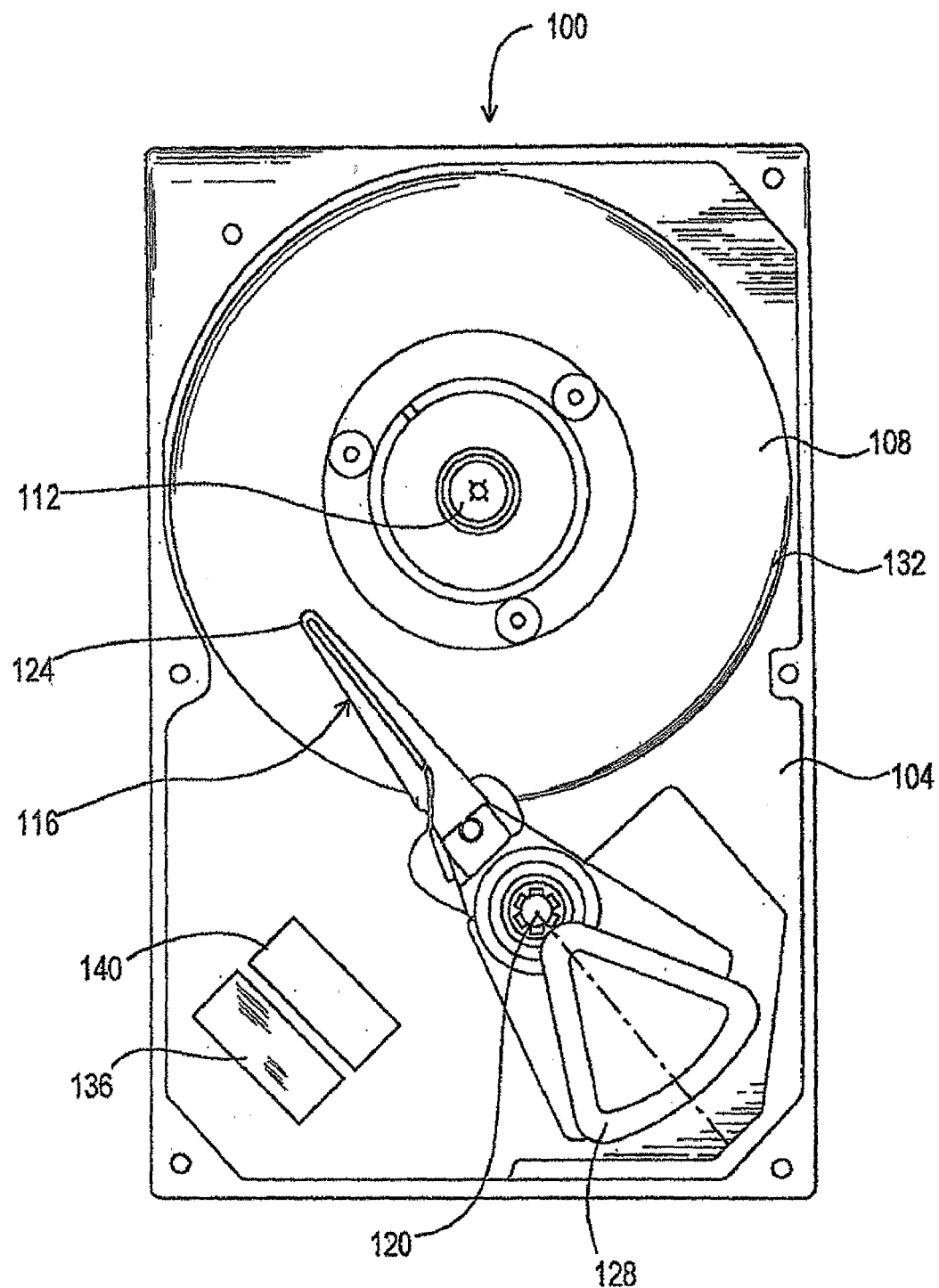
FIG. 1 is a diagrammatic representation of top view of a conventional computer disk drive, with the cover removed.

With reference now to FIG. 1, a typical disk drive 100 is illustrated. The disk drive 100 includes a base 104 and magnetic disks 108 (only one of which is shown in FIG. 1). The magnetic disks 108 are interconnected to the base 104 by a spindle motor (not shown) mounted within or beneath the hub 112 such that the disks 108 can be rotated relative to the base 104. The magnetic disk 108 is generally formed from a film of magnetically hard material deposited on a substrate. For example, the disk 108 may be formed by depositing a metal film on a rigid substrate.

Actuator arm assemblies 116 (only one of which is shown in FIG. 1) are interconnected to the base 104 by a bearing 120. Actuator arm assemblies 116 each include a transducer head 124 at a first end, to address each of the surfaces of the magnetic disks 108. The transducer heads 124 typically include read and write elements (not shown). A voice coil motor 128 pivots the actuator arm assemblies 116 about the bearing 120 to radially position the transducer heads 124 with respect to the magnetic disks 108. By changing the radial position of the transducer heads 124 with respect to the magnetic disks 108, the transducer heads 124 can access different tracks or cylinders 132 on the magnetic disks 108. The voice coil motor 128 is operated by a controller 136 that is in turn operatively connected to a host computer (not shown). A channel 140 processes information read from the magnetic disk 108 by the transducer heads 124.

Figure 2:
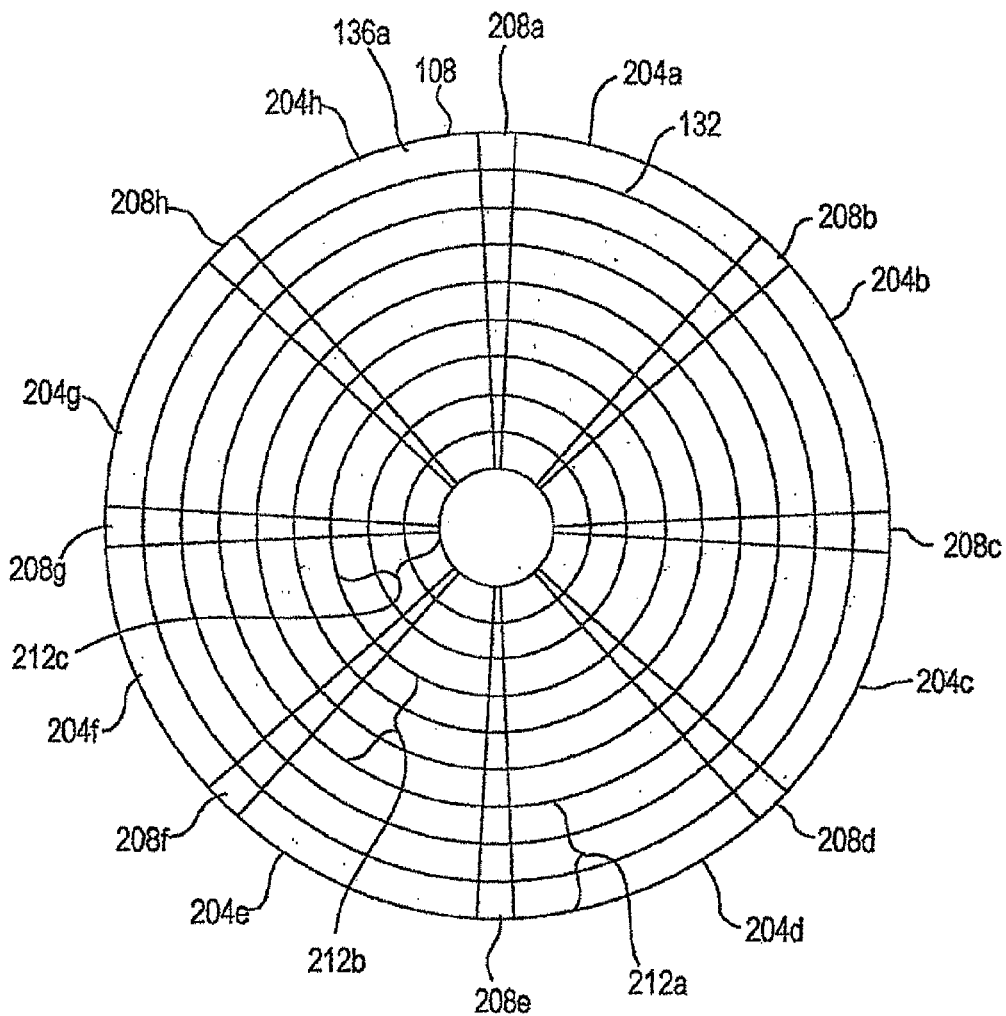
FIG. 2 is a diagrammatic representation of a magnetic storage disk.

With reference now to FIG. 2, a typical arrangement of data tracks 132 on a magnetic disk 108 is illustrated. Usually, the data tracks 132 are divided into data sectors 204a-h with a servo sector 208a-h between one or more of the data sectors 204a-h. Generally, the data sectors 204a-h are used for storing data, while the servo sectors 208a-h are used for storing servo information that is used to provide the transducer head 124 with positioning information. Typically, at least some of the information contained in the servo sectors 208a-h is written during the servo track writing process, and the portions of the servo sectors 208a-h containing such information generally cannot be written to after the disk drive 100 is assembled. In particular, the servo sectors 208a-h provide the transducer heads 124 with information concerning their position over the magnetic disks 108, including servo sector position bursts and embedded runout correction (ERC) fields, and information used to calibrate the channel 140, including automatic gain control (AGC) fields. Data and other information can be stored in tracks 132 according to either longitudinal or perpendicular recording schemes.

The tracks 132 on the magnetic disk 108 may further be divided into a plurality of zones 212a-c. The grouping of tracks 132 into a plurality of zones 212 facilitates the efficient storage of data on the disk 108. For example, because the disk 108 rotates at a constant speed, user data may be stored in tracks 132 associated with a zone (e.g., zone 212a) located towards an outside diameter of the disk 108 at a relatively high frequency, while maintaining adequate disk area to reliably store the data as magnetic transitions. In contrast, user data generally cannot be written to a track 132 within a zone (e.g., zone 212c) located towards an inner diameter of the disk 108 at the same high frequency as user data for storage in a track in a zone at an outer diameter, such as zone 212a. This is because at the inside diameter, insufficient disk area would be then used in connection with the magnetic transitions used to store user data reliably.

Although the magnetic disk 108 illustrated in FIGS. 1 and 2 is shown as having a relatively small number of data tracks 132, data sectors 204, servo sectors 208 and zones 212, it can be appreciated that a typical computer disk drive 100 contains a very large number of data tracks 132, data sectors 204, and servo or hard sectors 208, and may have a greater or lesser number of zones 212. For example, computer disk drives 100 having over 30,000 tracks per inch and 120 servo sectors are presently available.

In addition, alternate configurations of magnetic disks 108 are possible. For example, in a computer disk drive 100 having several magnetic disks 108, a surface of one of the disks 108 may be dedicated to servo information, while the surfaces of the remaining disks may be used exclusively to store data.

Figure 3A:
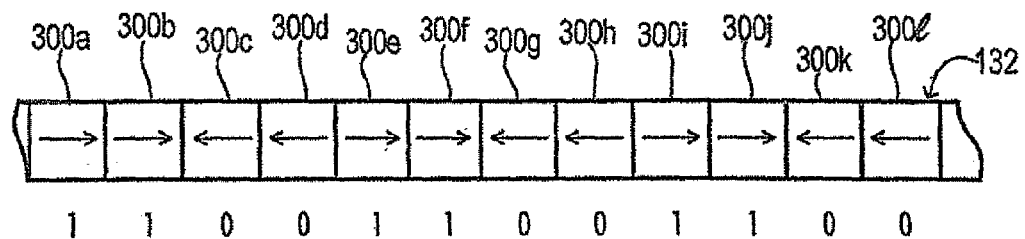
FIG. 3A depicts magnetic polarizations in a cross section of a track contained on a disk according to a longitudinal recording scheme.

With reference now to FIG. 3A, a portion of a track 132 to which a repeated pattern of data has been written according to a longitudinal recording scheme is schematically illustrated. The section of track 132 illustrated in FIG. 3A can be seen to contain a number of bit cells 300a-l. A bit cell is defined as the shortest length of track 132 that can encode a bit of user data, and corresponds to the minimum length of track 132 used to store a magnetic transition. An arrow in a bit cell 300 indicates the magnetic polarity of the bit cell 300. If the magnetization of a bit cell 300 in a given direction is a 1 and the magnetization of a bit cell in the opposite direction is a 0, it can be seen that the pattern of data produced by the pattern of magnetic transitions illustrated in FIG. 3A is such that each character is alternately repeated. That is, the pattern of bits is 1, 1, 0, 0, 1, 1, 0, 0 . . . as shown in FIG. 3A. In a 1T data pattern, the bits alternate 1, 0, 1, 0 . . . .

Figure 3B:
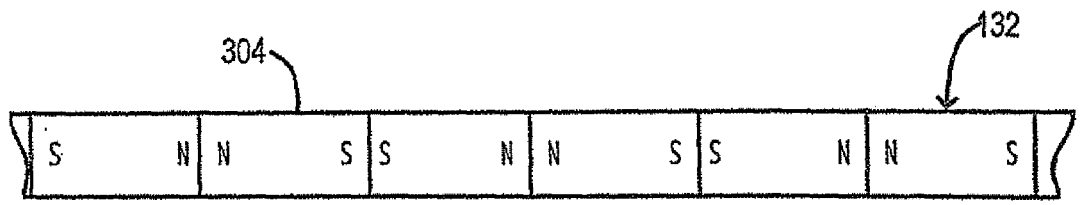
FIG. 3B depicts the magnetization of the cross section of a track illustrated in FIG. 3A.

With reference now to FIG. 3B, a pattern of magnetic polarities corresponding to the pattern of magnetization shown in FIG. 3A is illustrated. As shown in FIG. 3B, a pattern of magnetic polarities written to a track 132 effectively forms a series of magnets 304 in the track 132. As can be appreciated, at the boundaries of the magnets 304, which correspond to boundaries between bit cells 300 containing opposite magnetic polarities, the lines of magnetic flux produced by the magnets 304 will be normal to the surface of the disk 108 in the vicinity of the disk surface. In addition, the direction of the magnetic flux will be substantially parallel to the surface of the disk 108 in areas away from magnetic transitions in a longitudinal recording scheme. As can be appreciated, a transducer head 124 following a track 132 in close proximity to the surface of the disk 108 can sense these changes in magnetic flux. As will be understood by those of ordinary skill in the art, the changes in magnetic flux can be used to produce a voltage or a change in resistance in a read element of the transducer head 124.

Figure 3C:
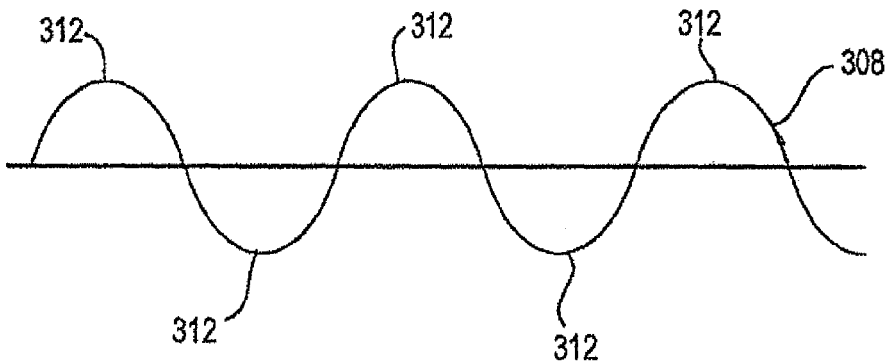
FIG. 3C illustrates an example voltage potential produced in the channel as a result of the pattern of magnetization depicted in FIG. 3B.

With reference now to FIG. 3C, a wave form 308 produced in the channel 140 as the transducer head 124 passes through the magnetic flux produced by the magnetization illustrated in FIG. 3A is depicted. In general, the wave form 308 is expressed in the channel as a voltage or current signal. Peaks 312 in the wave form 308 occur periodically. By comparing FIGS. 3A and 3C, it can be appreciated that the peaks 312 correspond to magnetic transitions written on the track 132. If magnetic domains within a bit cell 300 have their direction changed due to thermal decay, the amplitude observed at the peaks 312 in the wave form 308 will be reduced.

Figure 4A:
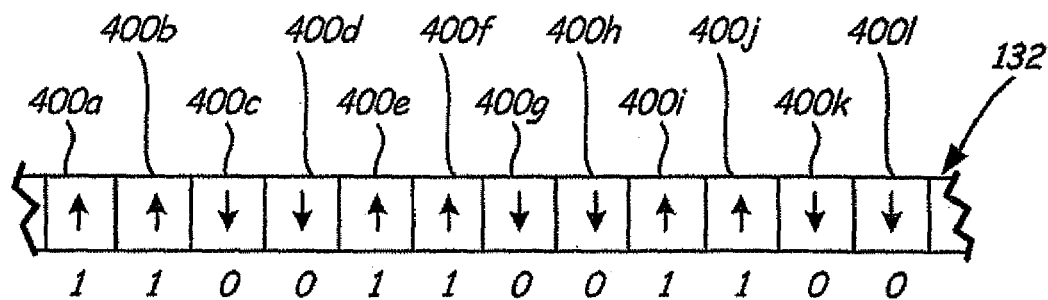
FIG. 4A depicts magnetic polarizations in a cross section of a track contained on a disk according to a perpendicular recording scheme.

With reference now to FIG. 4A, a portion of track 132 to which a repeated pattern of data has been written according to a perpendicular recording scheme is illustrated. As will be appreciated by a comparison of the portion of track 132 illustrated in FIG. 3A to the portion of track illustrated in FIG. 4A, the direction of magnetization of bit cells in FIG. 4A is perpendicular to the direction of travel of the track 132 relative to the transducer head 124. The series of bits encoded by the pattern of magnetization of the bit cells 400a-l illustrated in FIG. 4A is the same as in FIG. 3A.

Figure 4B:
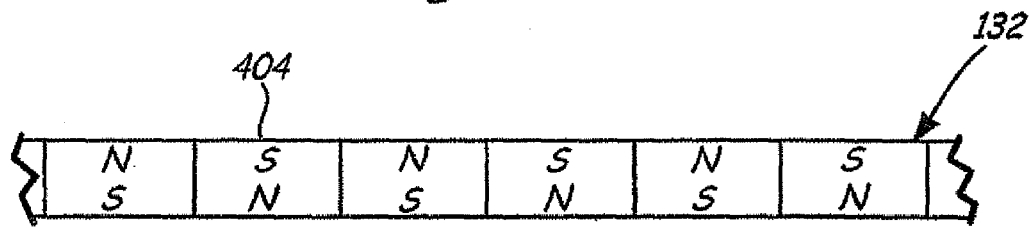
FIG. 4B depicts the magnetization of the cross section of a track illustrated in FIG. 4A.

FIG. 4B depicts a pattern of magnetic polarities corresponding to the pattern of magnetization illustrated in FIG. 4A. As will be appreciated from a comparison of the relevant figures, the magnets 404 in the perpendicular recording scheme illustrated in FIG. 4B are rotated 90° with respect to the magnets 304 of FIG. 3B.

Figure 4C:
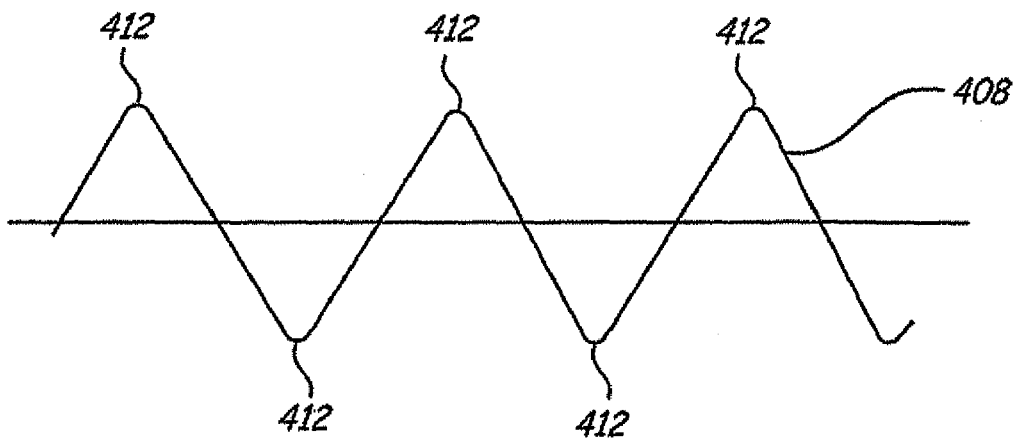
FIG. 4C illustrates an example voltage potential produced in the channel as a result of the pattern of magnetization depicted in FIG. 4B.

With reference now to FIG. 4C, a wave form 408 produced in the channel 140 as the transducer head 124 passes through the magnetic flux produced by the magnetization illustrated in FIG. 4B is depicted. In general, the peaks 412 correspond to those portions of the track 132 with respect to which the lines of magnetic flux are perpendicular to the relative direction of travel of the transducer head 124. As is the case with a longitudinal recording scheme (e.g., FIGS. 3A, 3B and 3C), the amplitude observed at the peaks 412 will be reduced if magnetic domains within a bit cell 400 have their direction changed due to thermal decay.

The inventors of the present invention have recognized that particular sequences of data and the location on the magnetic disk 108 to which data is written affect the susceptibility of the data to thermal decay. In general, with respect to a longitudinal recording scheme, a sequence of data featuring a relatively high number of magnetic transitions, such as a 1T pattern, utilizes a relatively small continuous volume of magnetic material for each magnetic polarization. Because fewer grains of magnetic material are aligned in the same direction, a change in the orientation of relatively few of the grains due to thermal decay has a relatively large effect. Also, if a sequence of data is written at a higher than normal frequency in a longitudinal recording scheme, the volume of each bit cell (e.g., bit cells 300 in FIG. 3A) will be smaller than the bit cells used to store regular user data. Therefore, such a sequence, which will have a relatively high data density, is again more likely to show the effects of thermal decay.

With respect to a perpendicular recording scheme, a sequence featuring a relatively low number of magnetic transitions, for example a 12T or 24T pattern, is more susceptible to thermal decay. In addition, a pattern written towards the outside diameter of a disk, where individual bit cells (e.g. bit cells 400 in FIG. 4A) are less crowded, is more susceptible to thermal decay. The likelihood that thermal decay will become apparent can also be increased by writing a test pattern at a frequency normally associated with a track 132 or zone 212 located towards the inside diameter of a disk 108 to a track 132 or zone 212 located towards an outside diameter of the disk 108 (i.e. by writing a pattern having a relatively low data density). In general, in a perpendicular recording scheme, the likelihood that thermal decay will become evident can be increased by magnetizing a relatively small area of a track 132 in a first direction, and magnetizing the surrounding areas of the track 132 in a second direction.

With respect to both longitudinal and perpendicular recording schemes, an area of the disk 108 having a thinner than normal layer of magnetic material will result in bit cells 300 or 400 having a smaller than normal volume of magnetic material. Therefore, a test pattern written to an area identified as having a particularly thin layer of magnetic material will be more susceptible to thermal decay. Thinner areas of a disk 108 may be the result of normal manufacturing variations, or they may be created intentionally during manufacture of the disk 108.

Figure 5:
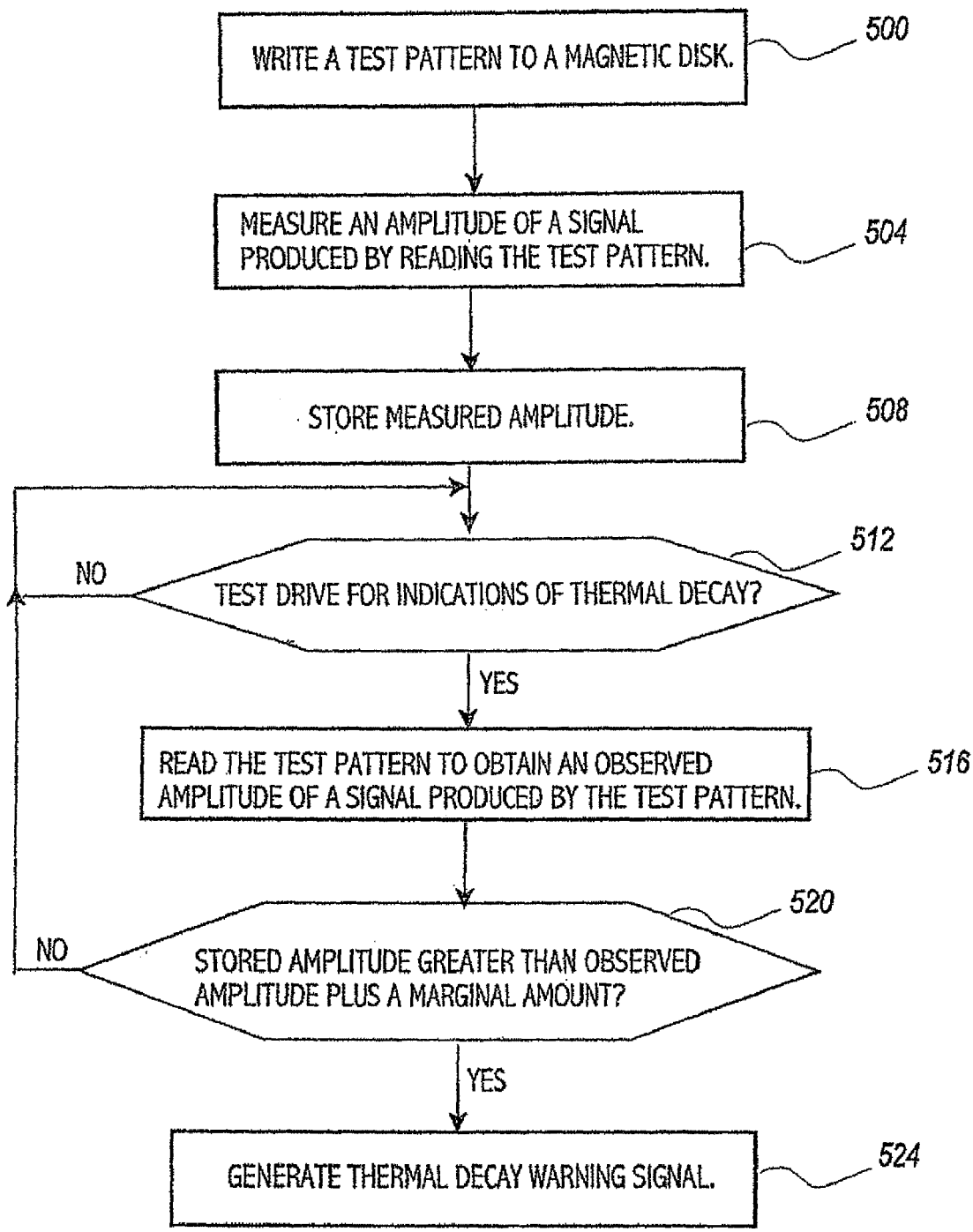
FIG. 5 is a functional flow diagram illustrating the operation of a system in accordance with an embodiment of the present invention.

With reference now to FIG. 5, a flow chart illustrating the operation of an embodiment of the present invention is illustrated. Initially, at step 500, a test pattern is written to the magnetic disk 108. In general, the test pattern is selected so that it is more susceptible to thermal decay than is normal user data.

With respect to a longitudinal recording scheme, the test pattern is preferably more susceptible to thermal decay than a 1T pattern written as normal user data. For example, the test pattern may be written at a frequency that is higher than the frequency used to write user data to the same or a similar track 132, and thus at a relatively high data density. The test pattern may be written at a higher frequency than that used for normal user data by writing the test pattern to a track 132 included in a zone 212 (e.g., zone 212c of FIG. 2) located towards an inner diameter of the disk 108 but using a data frequency that would normally be used to write user data to a track 132 associated with a zone 212 (e.g., zone 212a of FIG. 2) located towards an outer diameter of the disk 108. As noted above, in a longitudinal recording scheme such a pattern will tend to be more susceptible to the effects of thermal decay than user data, because the magnetic transitions are then written to a shorter length of track 132 than is user data, and therefore are contained in a relatively small volume of magnetic material.

With respect to a perpendicular recording scheme, the test pattern may be written so that the frequency of magnetic transitions is relatively low. For example, in accordance with one embodiment of the present invention, the test pattern is written as a 12T pattern. In accordance with still another embodiment of the present invention, the test pattern is written as a 24T pattern. In addition, the test pattern may be written at a lower frequency (and thus at a lower data density) than that used for normal user data, by writing the test pattern to a track 132 included in a zone 212 (e.g., zone 212a of FIG. 2) located towards an outside diameter of the disk 108 but using a data frequency that would normally be used to write user data to a track associated with a zone 212 (e.g., zone 212c of FIG. 2) located towards an inner diameter of the disk 108. A pattern of data written according to any of these embodiments in connection with a perpendicular recording scheme will be more likely to show the effects of thermal decay than user data, because bit cells 400 magnetized in a first direction are isolated among bit cells 400 magnetized in a second direction. Therefore, it is more likely that grains included in the bit cell 400 magnetized in a first direction will be flipped due to the effects of thermal decay.

In accordance with still another embodiment of the present invention, the test pattern may involve the writing of a series of magnetic transitions that is particularly susceptible to thermal decay. For example, a test pattern may be developed in which, due to the particular pattern of magnetic transitions, the magnetic domains that comprise the magnetic transitions are particularly unstable. Such a test pattern may be selected, at least in part, utilizing an automated process in which a plurality of evaluation test patterns are written to a disk 108. The disk 108 may then be stressed, for example, by subjecting the disk 108 to elevated temperatures. The evaluation test pattern with respect to which the greatest amount of thermal decay is evident may then be selected as a thermal decay test pattern for writing to all surfaces of the disk 108 included in a drive 100. Alternatively, such a determination may be made in connection with a family of disk drives 100 by analyzing a particular example disk drive 100. An example of such a test pattern in connection with a longitudinal recording scheme is a pattern that includes a combination of 2T and 1T patterns. In connection with a perpendicular recording scheme, such a test pattern may include a combination of 24T and 12T patterns.

At step 504, the amplitude of a signal produced in the channel 140 from reading the test pattern is measured. That amplitude, which will be used as a reference amplitude, is then stored (step 508). The amplitude may be stored in the disk drive 100 itself, for example on the magnetic storage disk 108, or in memory (not shown) associated with the disk drive 100. In general, steps 500-508 may be performed before the disk drive 100 is delivered to the end user.

At step 512, a determination is made as to whether the drive 100 should be tested for indications of thermal decay. For example, testing of the drive 100 may be indicated after a predetermined period of time has elapsed. For instance, a disk drive may initiate a self test for indications of thermal decay every two weeks. Alternatively or in addition, testing for thermal decay may be initiated in response to a user's instruction to begin such testing. Testing may also be indicated based on a combination of the amount of time that has elapsed since the last test was performed, and the operating temperature experienced by the disk drive 100. Once it has been determined that the disk drive 100 should be tested for indications of thermal decay, the test pattern is read from the disk 108 to obtain an observed amplitude of the signal produced in the channel 140 by the test pattern (step 516).

At step 520, a determination is made as to whether the stored reference amplitude is greater than the observed amplitude. In order to reduce the sensitivity of the disk drive 100 to normal variations in the observed amplitude, the comparison may be made between the stored amplitude and the observed amplitude plus a marginal value. In general, the marginal value should be large enough that a small attenuation of the observed signal, such as may be caused by noise in the channel 140, does not cause a thermal decay warning signal to be generated. If the stored amplitude is greater than the observed amplitude plus a marginal amount, a thermal decay warning signal is generated (step 524).

In response to a thermal decay warning signal, the hard disk drive 100 may take steps to ensure the integrity of user data stored in the disk drive 100. For example, data stored in the disk drive 100, or on a surface of a disk 108 in connection with which an indication of thermal decay has been detected, may be rewritten. Alternatively, the warning may be communicated to the user, and the user may decide what action should be taken to ensure the integrity of the data.

Figure 6:
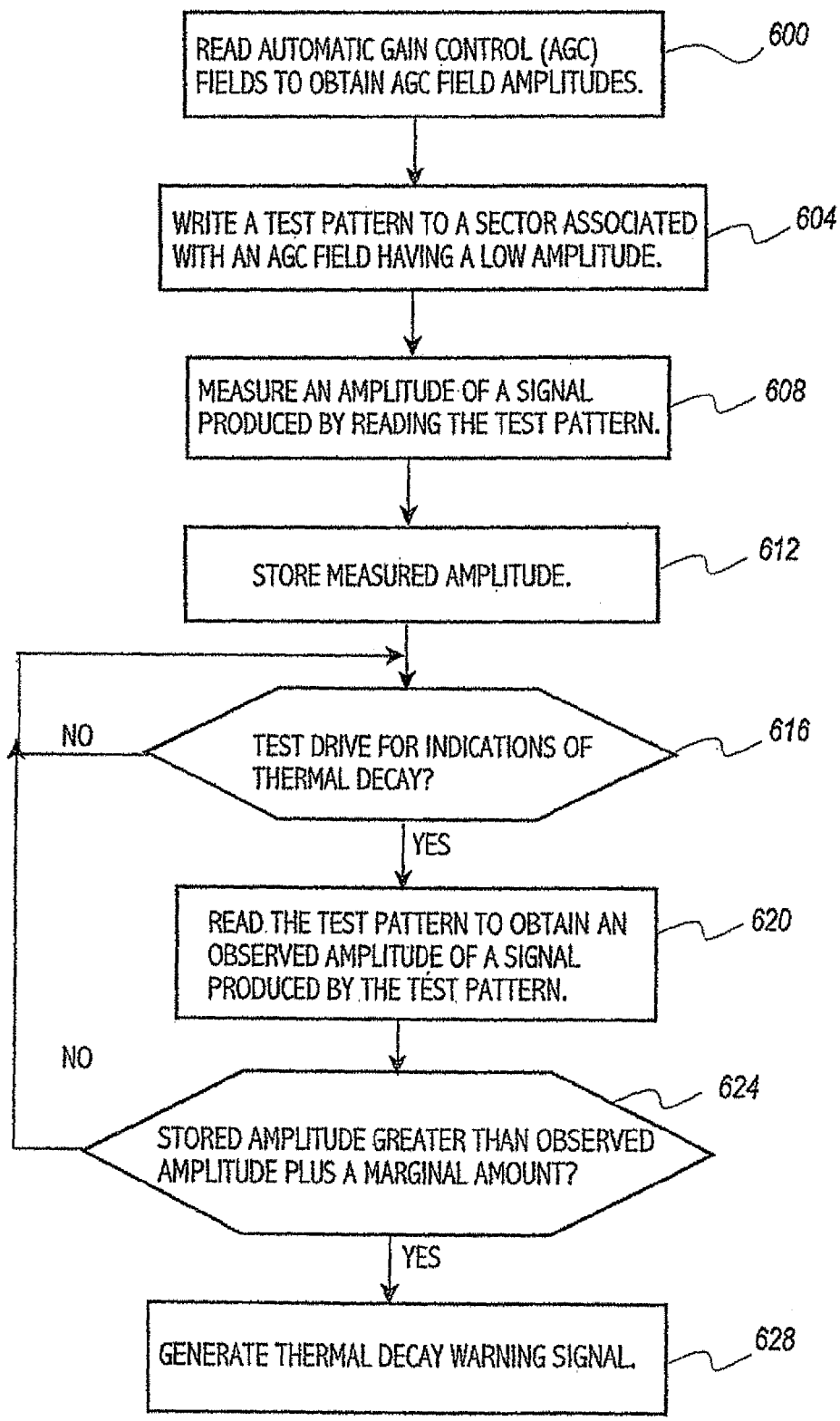
FIG. 6 is a functional flow diagram illustrating the operation of still another embodiment of the present invention.

With reference now to FIG. 6, a functional flow diagram in connection with another embodiment of the present invention is illustrated. Initially, at step 600, the amplitudes of automatic gain control (AGC) fields are measured in order to obtain the amplitudes of signals derived from those fields. At step 604, a test pattern is written to a sector of track 132 associated with an AGC field having a low amplitude. In general, a sector associated with an AGC field having a relatively low amplitude will be more susceptible to thermal decay, as described above. For example, a low AGC field amplitude may indicate an area of the disk 108 in which the layer of magnetic material is particularly thin. In accordance with an embodiment of the present invention, an AGC field amplitude may be considered low if it is at least about 10% less than an average AGC field amplitude. In accordance with another embodiment of the present invention, the AGC field amplitude may be considered low if it is about 5% less than an average AGC field amplitude. At step 608, the amplitude of a signal produced by reading the test pattern is measured. The measured amplitude is then stored (step 612). In general, steps 600-612 may be performed prior to delivery of the disk drive 100 to the end user.

Next, a determination is made as to whether testing for indications of thermal decay should be performed (step 616). As with the previous embodiment described in connection with FIG. 5, testing may be indicated after a predetermined period of time has elapsed, or after an instruction to test for thermal decay has been received from the user. If it has been determined that testing for thermal decay should proceed, the test pattern is read to obtain an observed amplitude of a signal produced by the test pattern in the channel 140 (step 620). The stored amplitude is then compared to the observed amplitude. If the stored amplitude is greater than the observed amplitude plus a marginal amount (step 624), a thermal decay warning signal is generated (step 628). If the stored amplitude is not greater than the observed amplitude plus a marginal amount, the drive returns to step 616 to await the next instruction to perform testing in connection with the detection of thermal decay.

In accordance with another embodiment of the present invention, a test pattern can be used in connection with a disk drive's 100 internal diagnostic procedures to provide an early warning of thermal decay. For example, the voltage gain amplitude (VGA) register value obtained when the transducer head 124 is reading the test pattern can be stored. When testing of the disk drive 100 is desired, the test pattern is again read and the VGA value obtained is compared to the stored VGA value. If the observed VGA value is 10% less than the stored VGA value, a thermal decay warning signal may be generated.

With respect to any of the embodiments of the present invention, testing for thermal decay may be performed in connection with each surface of each disk 108 included in a disk drive 100. Furthermore, certain of the described embodiments may be combined in a single, additional embodiment. For example, a test pattern that has been determined to be particularly susceptible to thermal decay may be written to an area of a disk surface that has been identified as being particularly susceptible to thermal decay. In addition, although the above description has used a hard disk drive as an example, the present invention is equally applicable to other types of magnetic storage devices.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for providing an early warning of thermal decay, comprising:
   writing a test pattern to a track of a magnetic disk, wherein said test pattern has a higher data density than a data density of user data in said track;
   measuring an amplitude of a signal produced by reading said test pattern;
   storing said measured amplitude;
   reading said test pattern from said track to obtain an observed amplitude of a signal produced by said test pattern;
   comparing said measured amplitude to said observed amplitude; and
   producing a thermal decay warning signal if said comparison is unfavorable.

2. The method of claim 1, wherein said test pattern has a test frequency in said track that is higher than a nominal data frequency for user data in said track.

3. The method of claim 2, wherein said track is located within a first zone of said magnetic disk, said test frequency is a nominal data frequency for user data in a second zone of said magnetic disk, and said first zone is located towards an inside diameter of said magnetic disk relative to said second zone.

4. The method of claim 1, further comprising identifying a sector of said magnetic disk at which a magnetic medium of said magnetic disk is thinner than an average thickness of said magnetic medium, and then writing said test pattern to said sector in response to said identification.

5. The method of claim 4, further comprising identifying said sector by measuring the amplitude of signals produced by automatic gain control fields, wherein said identified sector is associated with one of said automatic gain control fields producing an amplitude that is less than a nominal amplitude for said automatic gain control fields.

6. The method of claim 1, further comprising, in response to said thermal decay warning signal, refreshing data stored on said magnetic disk.

7. The method of claim 1, wherein said test pattern is written to each data storage surface of each magnetic disk included in a hard disk drive.

8. The method of claim 1, wherein said steps of reading said test pattern, comparing said measured amplitude, and producing said thermal decay warning signal are performed periodically.

9. The method of claim 1, further comprising creating a predetermined portion of said magnetic disk having a greater than average susceptibility to thermal decay during manufacture of said magnetic disk, and then writing said test pattern to said predetermined portion of said magnetic disk in response to identifying said predetermined portion of said magnetic disk.

10. The method of claim 1, wherein said test pattern is written in accordance with a longitudinal recording scheme.

11. A method for providing an early warning of thermal decay, comprising:
    writing a test pattern to a track of a magnetic disk, wherein said test pattern has a lower data density than a data density of user data in said track;
    measuring an amplitude of a signal produced by reading said test pattern;
    storing said measured amplitude;
    reading said test pattern from said track to obtain an observed amplitude of a signal produced by said test pattern;
    comparing said measured amplitude to said observed amplitude; and
    producing a thermal decay warning signal if said comparison is unfavorable.

12. The method of claim 11, wherein said test pattern has a test frequency in said track that is lower than a nominal data frequency for user data in said track.

13. The method of claim 12, wherein said track is located within a first zone of said magnetic disk, said test frequency is a nominal data frequency for user data in a second zone of said magnetic disk, and said first zone is located towards an outside diameter of said magnetic disk relative to said second zone.

14. The method of claim 11, further comprising identifying a sector of said magnetic disk at which a magnetic medium of said magnetic disk is thinner than an average thickness of said magnetic medium, and then writing said test pattern to said sector in response to said identification.

15. The method of claim 14, further comprising identifying said sector by measuring the amplitude of signals produced by automatic gain control fields, wherein said identified sector is associated with one of said automatic gain control fields producing an amplitude that is less than a nominal amplitude of said automatic gain control fields.

16. The method of claim 11, further comprising, in response to said thermal decay warning signal, refreshing data stored on at least a portion of said magnetic disk.

17. The method of claim 11, wherein said test pattern is written to each data storage surface of each magnetic disk included in a hard disk drive.

18. The method of claim 11, wherein said steps of reading said test pattern, comparing said measured amplitude, and producing said thermal decay warning signal are performed periodically.

19. The method of claim 11, further comprising creating a predetermined portion of said magnetic disk having a greater than average susceptibility to thermal decay during manufacture of said magnetic disk, and then writing said test pattern to said predetermined portion of said magnetic disk in response to identifying said predetermined portion of said magnetic disk.

20. The method of claim 11, wherein said test pattern is written in accordance with a perpendicular recording scheme.

21. A method for detecting thermal decay in a hard disk drive, comprising:
    identifying a sector of a magnetic disk having a magnetization that is less than an average magnetization for said magnetic disk;
    writing an early warning pattern to said sector;
    reading an amplitude of said early warning pattern to obtain a reference amplitude;
    storing said reference amplitude;
    reading an amplitude of said early warning pattern to obtain an observed amplitude; and
    producing a thermal decay warning signal if said observed amplitude is less than said reference amplitude by more than a predetermined amount.

22. The method of claim 21, further comprising identifying said sector by observing an amplitude of a selected type of servo sector information written to said disk, and then writing said early warning pattern to said sector in response to said identification, wherein said sector is associated with one of said selected type of servo sector information having an amplitude that is at least about 10% less than an average amplitude of said selected type of servo sector information.

23. The method of claim 22, wherein said selected type of servo sector information comprises automatic gain control information.

24. The method of claim 21, further comprising identifying said sector by identifying an area of said magnetic disk having a magnetic media thickness that is less than an average thickness of said magnetic media, and then writing said early warning pattern to said sector in response to said identification, wherein said sector is located in said area of said magnetic disk.

25. The method of claim 21, further comprising producing a predetermined area of said magnetic disk having a magnetic media thickness that is less than an average thickness of said magnetic media, and then writing said early warning pattern to said sector in response to identifying said predetermined area of said magnetic disk, wherein said sector has a magnetization that is less than an average magnetization for said magnetic disk and is located within said predetermined area of said magnetic disk.

26. The method of claim 25, wherein said hard disk drive stores data according to a longitudinal recording scheme, and said predetermined area of said magnetic disk is located towards an inner diameter of said magnetic disk.

27. The method of claim 25, wherein said hard disk drive stores data according to a perpendicular recording scheme, and said predetermined area of said magnetic disk is located towards an outer diameter of said magnetic disk.

28. The method of claim 21, wherein said hard disk drive stores data according to a longitudinal recording scheme, and said early warning pattern has a frequency in said sector greater than a nominal data frequency for user data stored on a track comprising said sector.

29. The method of claim 21, wherein said hard disk drive stores data according to a perpendicular recording scheme, and said early warning pattern has a frequency in said sector less than a nominal data frequency for user data stored on a track comprising said sector.

30. A method of detecting thermal decay in a magnetic storage device, comprising:
    writing a test pattern having a greater susceptibility to thermal decay than a 1T pattern to a magnetic storage medium;
    reading an amplitude of a signal produced by said test pattern to obtain a reference amplitude;
    storing said reference amplitude;

reading an amplitude of a signal produced by said test pattern to obtain an observed amplitude;

comparing said reference amplitude to said observed amplitude; and in response to an unfavorable comparison, producing a thermal decay warning signal.

31. The method of claim 30, further comprising:

writing a first evaluation test pattern to said magnetic storage medium;

writing a second evaluation test pattern to said magnetic storage medium; and selecting said test pattern from said first and second evaluation test patterns.

32. The method of claim 30, further comprising identifying a portion of said magnetic storage medium having a susceptibility to thermal decay that is greater than an average susceptibility to thermal decay of said magnetic storage medium, and then writing said test pattern to said portion of said magnetic storage medium in response to said identification.

33. The method of claim 32, wherein said portion of said magnetic storage medium has a less than average magnetic storage material thickness.

34. The method of claim 30, wherein said magnetic storage device stores data according to a longitudinal recording scheme.

35. The method of claim 30, wherein said magnetic storage device stores data according to a perpendicular recording scheme.

36. A hard disk drive, comprising:

a base;

a magnetic storage disk comprising a magnetic storage material and data tracks;

a transducer head for reading and writing information to and from said data tracks, wherein said information comprises a test pattern, and said transducer head is movable in a radial direction with respect to said disk to address a selected one of said data tracks;

a voice coil motor for moving said transducer head with respect to said data tracks;

a controller, interconnected to said voice coil motor, for controlling a position of said transducer head with respect to said data tracks; and a channel, interconnected to said transducer head, wherein an amplitude of a signal derived from said test pattern in a data track of said data tracks and having a greater susceptibility to thermal decay than user data in said data track is transmitted by said channel, and a thermal decay warning signal is generated if said amplitude of said warning signal is less than a reference amplitude.

37. The hard disk drive of claim 36, wherein said test pattern is written to an area of said magnetic storage disk having a magnetic storage material thickness that is less than a prescribed amount in response to identifying said area of said magnetic storage disk.

38. The hard disk drive of claim 37, wherein said prescribed amount has a thickness that is less than about 90% of an average thickness of said magnetic storage material.

39. The hard disk drive of claim 37, wherein said magnetic storage disk is formed having a magnetic storage material thickness that is intentionally reduced in said area of said magnetic storage disk.

40. The hard disk drive of claim 36, wherein said test pattern is written to an area of said magnetic storage disk having an increased probability that magnetic domains in said area will return to a direction occupied by said magnetic domains in response to identifying said area of said magnetic storage disk.

41. The hard disk drive of claim 36, wherein said hard disk drive stores data using a longitudinal recording scheme, said data track is located in a first zone of said magnetic storage disk, said test pattern has a test frequency that corresponds to a data frequency for user data located in a second zone of said magnetic storage disk, and said second zone is located farther from an interior diameter of said magnetic storage disk than is said first zone.

42. The hard disk drive of claim 36, wherein said hard disk drive stores data using a perpendicular recording scheme, said data track is located in a first zone of said magnetic storage disk, said test pattern has a test frequency that corresponds to a data frequency for user data located in a second zone of said magnetic storage disk, and said second zone is located farther from an outside diameter of said magnetic storage disk than is said first zone.

43. The hard disk drive of claim 36, wherein said hard disk drive stores data using a longitudinal recording scheme, and said test pattern has a test frequency in said data track that is greater than a nominal frequency of said user data in said data track.

44. The hard disk drive of claim 36, wherein said hard disk drive stores data using a perpendicular recording scheme, and said test pattern has a test frequency in said data track that is less than a nominal frequency of said user data in said data track.

45. The hard disk drive of claim 36, wherein said hard disk drive stores data using a perpendicular recording scheme, and said test pattern comprises a 12T pattern or greater.

46. The hard disk drive of claim 36, wherein said hard disk drive stores data using a perpendicular recording scheme, and said test pattern comprises a 24T pattern or greater.

47. A hard disk drive, comprising:

a base;

a magnetic storage disk comprising a magnetic storage material and data tracks, wherein a data track of said data tracks has a reduced magnetization capacity;

a transducer head for reading and writing information to and from said data tracks, wherein said information comprises a test pattern, and said transducer head is movable in a radial direction with respect to said disk to address a selected one of said data tracks;

a voice coil motor for moving said transducer head with respect to said data tracks;

a controller, interconnected to said voice coil motor, for controlling a position of said transducer head with respect to said data tracks; and a channel, interconnected to said transducer head, wherein an amplitude of a signal derived from said test pattern in said data track and having a different data density in said data track than user data in said data track is transmitted by said channel, and a thermal decay warning signal is generated if said amplitude of said warning signal is less than a reference amplitude.

48. The hard disk drive of claim 47, wherein said reduced magnetization capacity of said data track corresponds to a reduced magnetic storage material thickness.

49. The hard disk drive of claim 48, wherein an area of said magnetic storage disk comprising said data track and said reduced magnetic storage material thickness is formed at a predetermined location on said magnetic storage disk.

50. The hard disk drive of claim 49, wherein said hard disk drive stores data according to a longitudinal recording scheme, and said predetermined location is towards an inside diameter of said magnetic storage disk.

51. The hard disk drive of claim 49, wherein said hard disk drive stores data according to a perpendicular recording scheme, and said predetermined location is towards an outside diameter of said magnetic storage disk.

52. The hard disk drive of claim 47, wherein said hard disk drive stores data according to a longitudinal recording scheme, and said test pattern has a higher frequency in said data track than a user data frequency in said data track.

53. The hard disk drive of claim 47, wherein said hard disk drive stores data according to a perpendicular recording scheme, and said test pattern comprises a 12T or greater pattern.

54. The hard disk drive of claim 47, wherein said hard disk drive stores data according to a perpendicular recording scheme, and said test pattern comprises a 24T or greater pattern.

55. The hard disk drive of claim 47, wherein said hard disk drive stores data according to a perpendicular recording scheme, and said test pattern comprises a 12T pattern and a 24T pattern.

56. A hard disk drive, comprising:
   a base;
   a magnetic storage disk comprising a magnetic storage material and data tracks, wherein a data track of said data tracks has a reduced magnetization capacity;
   a transducer head for reading and writing information to and from said data tracks, wherein said information comprises an early warning pattern, and said transducer head is movable in a radial direction with respect to said disk to address a selected one of said data tracks;
   a voice coil motor for moving said transducer head with respect to said data tracks;
   a controller, interconnected to said voice coil motor, for controlling a position of said transducer head with respect to said data tracks; and
   a channel, interconnected to said transducer head, wherein an amplitude of a signal derived from said early warning pattern in said data track and having a greater susceptibility to thermal decay than a 1T pattern in said data track is transmitted by said channel, and a thermal decay warning signal is generated if said amplitude of said warning signal is less than a reference amplitude.

57. The hard disk drive of claim 56, wherein said early warning pattern is written to an area of said magnetic storage disk having a magnetic storage material thickness that is less than a prescribed amount in response to identifying said area of said magnetic storage disk.

58. The hard disk drive of claim 57, wherein said hard disk drive identifies said area of said magnetic storage disk in response to reading servo information from said magnetic storage disk.

59. The hard disk drive of claim 58, wherein said hard disk drive identifies said area of said magnetic storage disk at a factory before said hard disk drive is shipped to an end user.

60. The hard disk drive of claim 58, wherein said servo information is automatic gain control information.

61. A method for providing an early warning of thermal decay in a disk drive, wherein the disk drive includes a magnetic disk, the disk includes a track, a test pattern on the track has a different data density than user data on the track, and the disk drive stores a reference amplitude, the method comprising:
   reading the test pattern from the track to obtain an observed amplitude;
   comparing the reference amplitude to the observed amplitude; and
   producing a thermal decay warning signal if the comparison is unfavorable.

62. The method of claim 61, wherein the test pattern is an early warning pattern that has greater susceptibility to thermal decay than any servo information and any user data on the disk.

63. The method of claim 61, wherein the test pattern on the track has a higher susceptibility to thermal decay than user data on the track due to the different data density.

64. The method of claim 61, wherein the test pattern on the track has a higher susceptibility to thermal decay than a 1T pattern on the track due to the test pattern on the track having a different data density than the 1T pattern on the track.

65. The method of claim 61, wherein the disk includes first and second zones, the track is located in the first zone, and the test pattern has the same data density as user data in the second zone.

66. A method for providing an early warning of thermal decay in a disk drive, wherein the disk drive includes a magnetic disk, the disk includes a track, a test pattern on the track has a larger data density than user data on the track, and the disk drive stores a reference amplitude, the method comprising:
   reading the test pattern from the track to obtain an observed amplitude;
   comparing the reference amplitude to the observed amplitude; and
   producing a thermal decay warning signal if the comparison is unfavorable.

67. The method of claim 66, wherein the test pattern is an early warning pattern that has greater susceptibility to thermal decay than any servo information and any user data on the disk.

68. The method of claim 66, wherein the test pattern on the track has a higher susceptibility to thermal decay than user data on the track due to the larger data density.

69. The method of claim 66, wherein the test pattern on the track has a higher susceptibility to thermal decay than a 1T pattern on the track due to the test pattern on the track having a larger data density than the 1T pattern on the track.

70. The method of claim 66, wherein the disk includes first and second zones, the track is located in the first zone, and the test pattern has the same data density as user data in the second zone.

71. A method for providing an early warning of thermal decay in a disk drive, wherein the disk drive includes a magnetic disk, the disk includes a track, a test pattern on the track has a smaller data density than user data on the track, and the disk drive stores a reference amplitude, the method comprising:
   reading the test pattern from the track to obtain an observed amplitude;
   comparing the reference amplitude to the observed amplitude; and
   producing a thermal decay warning signal if the comparison is unfavorable.

72. The method of claim 71, wherein the test pattern is an early warning pattern that has greater susceptibility to thermal decay than any servo information and any user data on the disk.

73. The method of claim 71, wherein the test pattern on the track has a higher susceptibility to thermal decay than user data on the track due to the smaller data density.

74. The method of claim 71, wherein the test pattern on the track has a higher susceptibility to thermal decay than a 1T pattern on the track due to the test pattern on the track having a smaller data density than the 1T pattern on the track.

75. The method of claim 71, wherein the disk includes first and second zones, the track is located in the first zone, and the test pattern has the same data density as user data in the second zone.

76. A method for providing an early warning of thermal decay in a disk drive, wherein the disk drive includes a magnetic disk, the disk includes a track, a test pattern on the track has a different data density than a 1T pattern on the track, and the disk drive stores a reference amplitude, the method comprising:
- reading the test pattern from the track to obtain an observed amplitude;
- comparing the reference amplitude to the observed amplitude; and
- producing a thermal decay warning signal if the comparison is unfavorable.

77. The method of claim 76, wherein the test pattern is an early warning pattern that has greater susceptibility to thermal decay than any servo information and any user data on the disk.

78. The method of claim 76, wherein the test pattern on the track has a higher susceptibility to thermal decay than the 1T pattern on the track due to the different data density.

79. The method of claim 78, wherein the test pattern on the track has a larger data density than the 1T pattern on the track.

80. The method of claim 78, wherein the test pattern on the track has a smaller data density than the 1T pattern on the track.

81. A method for providing an early warning of thermal decay in a disk drive, wherein the disk drive includes a magnetic disk, the method comprising the following steps in the sequence set forth:
- identifying a sector on the disk that has a greater than average susceptibility to thermal decay;
- writing a test pattern to the sector in response to identifying the sector;
- reading the test pattern from the sector to obtain a reference amplitude;
- storing the reference amplitude in the disk drive;
- reading the test pattern from the sector to obtain a measured amplitude;
- comparing the reference amplitude and the measured amplitude; and
- producing a thermal decay warning signal if the comparison is unfavorable.

82. The method of claim 81, wherein identifying the sector includes:
- reading servo information from the disk to obtain measured servo amplitudes; and
- determining a portion of the disk that has a greater than average susceptibility to thermal decay based on the measured servo amplitudes, wherein the sector is associated with the portion of the disk.

83. The method of claim 82, wherein the servo information is automatic gain control information.

84. The method of claim 81, wherein identifying the sector includes determining a portion of the disk in which magnetic media of the disk is thinner than an average thickness of the magnetic media of the disk, and the sector is associated with the portion of the disk.

85. The method of claim 81, wherein identifying the sector includes manufacturing the disk so that magnetic media in a predetermined portion of the disk is thinner than an average thickness of the magnetic media in the disk, and the sector is associated with the predetermined portion of the disk.

86. A method for providing an early warning of thermal decay in a disk drive, wherein the disk drive includes a magnetic disk, the method comprising the following steps in the sequence set forth:
- identifying a sector on the disk that has a greater than average susceptibility to thermal decay;
- writing a test pattern to the sector in response to identifying the sector, wherein the test pattern has a greater susceptibility to thermal decay than any servo information and any user data on the disk;
- reading the test pattern from the sector to obtain a reference amplitude;
- storing the reference amplitude in the disk drive;
- reading the test pattern from the sector to obtain a measured amplitude;
- comparing the reference amplitude and the measured amplitude; and
- producing a thermal decay warning signal if the comparison is unfavorable.

87. The method of claim 86, wherein identifying the sector includes:
- reading servo information from the disk to obtain measured servo amplitudes; and
- determining a portion of the disk that has a greater than average susceptibility to thermal decay based on the measured servo amplitudes, wherein the sector is associated with the portion of the disk.

88. The method of claim 87, wherein the servo information is automatic gain control information.

89. The method of claim 86, wherein identifying the sector includes determining a portion of the disk in which magnetic media of the disk is thinner than an average thickness of the magnetic media of the disk, and the sector is associated with the portion of the disk.

90. The method of claim 86, wherein identifying the sector includes manufacturing the disk so that magnetic media in a predetermined portion of the disk is thinner than an average thickness of the magnetic media in the disk, and the sector is associated with the predetermined portion of the disk.

91. A method for providing an early warning of thermal decay in a disk drive, wherein the disk drive includes a magnetic disk, the method comprising the following steps in the sequence set forth:
- identifying a sector on the disk that has a greater than average susceptibility to thermal decay;
- writing a test pattern to the sector in response to identifying the sector;
- reading the test pattern from the sector to obtain a reference amplitude;
- storing the reference amplitude in the disk drive;
- shipping the disk drive from a factory to an end user;
- reading the test pattern from the sector to obtain a measured amplitude;
- comparing the reference amplitude and the measured amplitude; and
- producing a thermal decay warning signal if the comparison is unfavorable.

92. The method of claim 91, wherein identifying the sector includes:
- reading servo information from the disk to obtain measured servo amplitudes; and
- determining a portion of the disk that has a greater than average susceptibility to thermal decay based on the measured servo amplitudes, wherein the sector is associated with the portion of the disk.

93. The method of claim 92, wherein the servo information is automatic gain control information.

94. The method of claim 91, wherein identifying the sector includes determining a portion of the disk in which magnetic media of the disk is thinner than an average thickness of the magnetic media of the disk, and the sector is associated with the portion of the disk.

95. The method of claim 91, wherein identifying the sector includes manufacturing the disk so that magnetic media in a predetermined portion of the disk is thinner than an average thickness of the magnetic media in the disk, and the sector is associated with the predetermined portion of the disk.

96. A method for providing an early warning of thermal decay in a disk drive, wherein the disk drive includes a magnetic disk, the method comprising the following steps in the sequence set forth:

writing evaluation test patterns to the disk;

reading the evaluation test patterns from the disk;

selecting a test pattern from the evaluation test patterns that exhibits the greatest amount of thermal decay;

writing the test pattern to a sector on the disk;

reading the test pattern from the sector to obtain a reference amplitude;

storing the reference amplitude in the disk drive;

reading the test pattern from the sector to obtain a measured amplitude;

comparing the reference amplitude and the measured amplitude; and producing a thermal decay warning signal if the comparison is unfavorable.

97. The method of claim 96, including subjecting the disk to elevated temperature between writing and reading the evaluation test patterns.

98. The method of claim 96, wherein the test pattern has a greater susceptibility to thermal decay than any servo information and any user data on the disk.

99. The method of claim 98, wherein the test pattern on a track of the disk has a larger data density than a 1T pattern on the track.

100. The method of claim 98, wherein the test pattern on a track of the disk has a smaller data density than a 1T pattern on the track.

* * * * *